United States Patent
Miri et al.

(10) Patent No.: US 7,571,138 B2
(45) Date of Patent: Aug. 4, 2009

(54) METHOD, SYSTEM AND PROGRAM FOR CREDIT RISK MANAGEMENT UTILIZING CREDIT LIMITS

(75) Inventors: John Miri, Cedar Park, TX (US); Jarod Belshaw, Austin, TX (US); Samuel Jesse Farley, Austin, TX (US); Colin Hendricks, Houston, TX (US); Paul Kaisharis, Missouri City, TX (US); Corey Heath, Houston, TX (US); Mark Silhavy, Richmond, TX (US); Misbah Abassi, Houston, TX (US); Dan Reid, Houston, TX (US); Cynthia Haynie, Houston, TX (US)

(73) Assignee: Rome Corporation, Austin, TX (US)

( * ) Notice: Subject to any disclaimer, the term of this patent is extended or adjusted under 35 U.S.C. 154(b) by 736 days.

(21) Appl. No.: 10/942,185

(22) Filed: Sep. 16, 2004

(65) Prior Publication Data
US 2005/0114244 A1 May 26, 2005

Related U.S. Application Data

(60) Provisional application No. 60/503,429, filed on Sep. 16, 2003, provisional application No. 60/503,422, filed on Sep. 16, 2003.

(51) Int. Cl.
*G06Q 40/00* (2006.01)
(52) U.S. Cl. .............................. 705/38; 705/26; 705/4; 707/102
(58) Field of Classification Search ................... 705/38, 705/26, 4; 707/100, 103, 102
See application file for complete search history.

(56) References Cited

U.S. PATENT DOCUMENTS

| | | | | |
|---|---|---|---|---|
| 5,630,127 A * | 5/1997 | Moore et al. | ............ | 707/103 R |
| 5,787,430 A * | 7/1998 | Doeringer et al. | ............ | 707/100 |
| 5,987,423 A * | 11/1999 | Arnold et al. | ................. | 705/14 |
| 6,085,187 A * | 7/2000 | Carter et al. | .................. | 707/3 |
| 6,442,557 B1 * | 8/2002 | Buteau et al. | ............... | 707/102 |
| 2001/0034622 A1 * | 10/2001 | Davis | ............................. | 705/4 |
| 2003/0046095 A1 * | 3/2003 | Jessop et al. | ................... | 705/1 |
| 2003/0093284 A1 * | 5/2003 | Kootale | ......................... | 705/1 |
| 2003/0115133 A1 * | 6/2003 | Bian | ........................... | 705/38 |
| 2004/0199443 A1 * | 10/2004 | Gaston et al. | ................. | 705/35 |
| 2004/0215551 A1 * | 10/2004 | Eder | ........................... | 705/38 |
| 2005/0038690 A1 * | 2/2005 | Hayes-Roth | .................. | 705/9 |

* cited by examiner

*Primary Examiner*—Vincent Millin
*Assistant Examiner*—Thu Thao Havan
(74) *Attorney, Agent, or Firm*—Dillon & Yudell LLP

(57) ABSTRACT

Software aggregates and integrates credit exposure and credit data across accounting, trading and operational systems within an organization and generates views of available credit in light of the exposure and credit limits. A comprehensive model of exposure to all counterparties, across all of their divisions and subsidiaries, is assembled, enabling the creation of a hierarchical view of each counterparty that models its real-world parent-child relationships. Credit limits are set across the enterprise, supporting the organization's unique methodology and business process, and on a granular basis, incorporating factors such as external credit ratings, internal credit scores, commodity, geographic region, deal duration, and security instruments. Credit, transactions, and risk are then determined at any level in the hierarchy. After aggregating exposure and credit limit information, the system presents a comprehensive, detailed, real-time, enterprise-wide view of current exposure, collateral requirements and available credit for both a company and its counterparties, making it easy for users to identify trouble spots by counterparty, geography, industry, and credit rating and to manage the company's liquidity.

27 Claims, 10 Drawing Sheets

METHOD, SYSTEM AND PROGRAM FOR CREDIT RISK MANAGEMENT UTILIZING CREDIT LIMITS

PRIORITY CLAIM

The application claims the benefit of priority under 35 U.S.C. §119(e) from U.S. Provisional Application No. 60/503,429, entitled, "Method, System and Program for Credit Risk Management Utilizing Credit Exposure," filed on Sep. 16, 2003, and U.S. Provisional Application No. 60/503,422, entitled, "Method, System and Program for Credit Risk Management Utilizing Credit Limits," filed on Sep. 16, 2003, which disclosures are incorporated herein by reference.

CROSS-REFERENCE TO RELATED APPLICATIONS

The present application is related to co-pending U.S. patent application Ser. No. 10/942/196, filed on even date herewith and assigned to the assignee hereof, and incorporated herein by reference in its entirety.

TECHNICAL FIELD

The present invention relates generally to methods, systems and programs for credit risk management. Still more particularly, the present invention relates to methods, systems and programs for credit risk management based on defined relationships and associated credit limits.

BACKGROUND

Dramatic changes in industry have exposed the need for new processes and tools to measure, analyze and manage credit and liquidity. For example, energy companies have been reeling from corporate scandals, increased scrutiny and disclosure, and several well-publicized bankruptcies. As a result, companies are planning for contingent liquidity requirements and managing company-wide credit by requiring near-real-time profiles of the company's credit exposure and obligations. Some companies do business with hundreds of different counterparties and, therefore, have risk associated with hundreds of different legal entities based on a myriad of different commodities. The data about these counterparties and the transactions executed with them is spread across many different specialized commodity-trading systems.

Unfortunately, the commodity-based nature of enterprise resource planning, integration, trading and risk management software currently used in most industries revolve around accounts and transactions as opposed to customer relationships or counterparties and their associated contracts. This places the relevant data scattered across multiple, disparate systems and forces company executives to manually pull together necessary information and resort to spreadsheets and calculators to obtain the information they need to assess credit risk and make critical decisions regarding their company's credit exposure and obligations. An organization's financial stability depends on a timely, accurate and authoritative picture of credit exposure and liquidity obligations, so it may identify trouble spots, move quickly to mitigate counterparty credit risk, and improve the company's liquidity. This critical information must be made available to organizations by presenting a comprehensive, detailed, real-time picture of current exposure and collateral requirements for both the company and its counterparties. Yet, no current solution provides an effective method to track and analyze credit exposure and liquidity obligations across multiple systems. In addition to data aggregation limitations, the current offerings do not take advantage of contemporary technologies that allow for simplified adaptation of changing functional requirements and near-real-time processing. Accordingly, it would be desirable to provide a method, system and program to overcome these problems in the art.

SUMMARY OF THE INVENTION

In accordance with the present invention, improved methods, systems and articles of manufacture for managing credit exposure are disclosed. In one preferred embodiment of the present invention, a hierarchical model of legally associated counterparties and associated transactions with an organization is created, wherein the hierarchical model includes one or more levels containing a plurality of nodes, wherein the plurality of nodes comprises the legally associated counterparties, transactions and master agreements between the legally associated counterparties and an organization. Financial exposure for the organization at each node of the hierarchical model is calculated. Credit limit categories are created, wherein each credit limit category comprises one or more nodes of the plurality of nodes having a common characteristic. Last, a credit limit for a credit limit category based on credit limits set for the one or more nodes comprising the credit limit category is calculated.

All objects, features, and advantages of the present invention will become apparent in the following detailed written description.

BRIEF DESCRIPTION OF DRAWINGS

This invention is described in a preferred embodiment in the following description with reference to the drawings, in which like numbers represent the same or similar elements and one or a plurality of such elements, as follows.

DETAILED DESCRIPTION OF PREFERRED EMBODIMENTS

Figure 1:
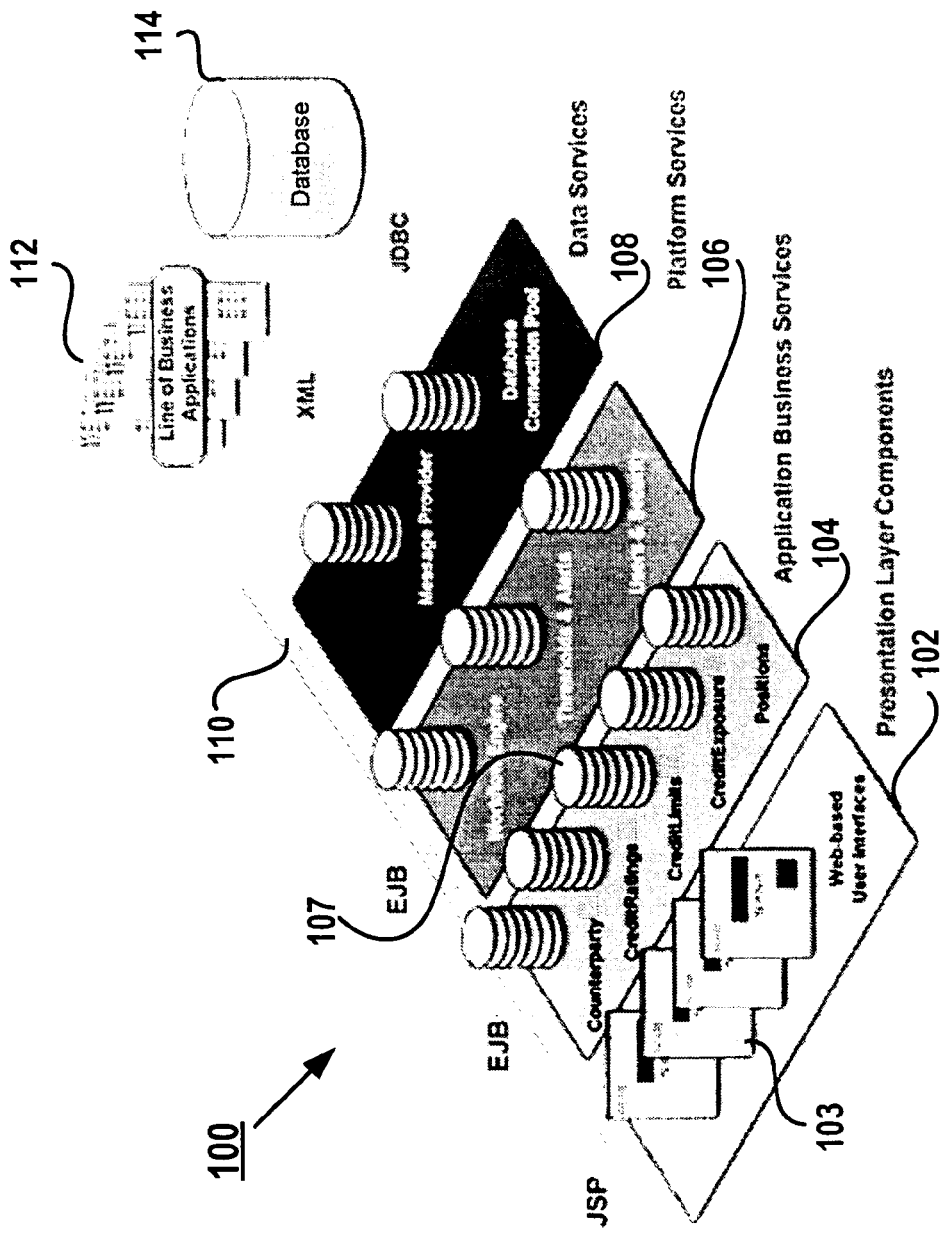
FIG. 1 depicts a conceptual diagram of a software architecture in which a preferred embodiment of the prevent invention may be implemented.

With reference now to FIG. 1, there is depicted a conceptual diagram of a software architecture in which a preferred embodiment of the prevent invention may be implemented. The software system 100 comprises application layers or objects, including presentation layer components 102, application business services 104, platform services 106 and data services 108 connected by a communication link 110. Each of the application layers 102-108 communicate with various other business applications 112 utilized within a line of business of an enterprise and a database 114 for storage of application data. Line of business applications 112 may be accounting software, trading software and other risk management applications, for example. Presentation layers 102-108 communicate over link 110. Presentation layers 102-108 also communicate with line-of-business applications 112 and universal database 114 over link 110 for storing and retrieving data accessed and generated by the software system 100.

Presentation layer components 102 contains a plurality of web-based user interfaces 103 to provide user display and interface to software system 100 and are built on Java Server Page. Application business services layer 104 includes a plurality of software applications to organize, analyze and manage an enterprise's credit risk, the modules including counterparty, credit ratings, credit limits, credit exposure and positions functionality providing various application services. Application business services 104 includes a credit exposure module 105 and a credit limits modules 107 that cooperate to provide an organization's enterprise view of their current and future financial exposure based on their credit limits. Platform services 106 contain service applications to provide general management of users and security, to issue thresholds and alerts, and to provide a workflow engine for communicating workflow between the various layers 102-108. Layers 104, 106 run on Enterprise JavaBeans (EJB). Data services 108 contains a message provider and database connection pool applications to provide data services among the other layers 102-106 and between line of business applications 112 and database 114.

Figure 2:
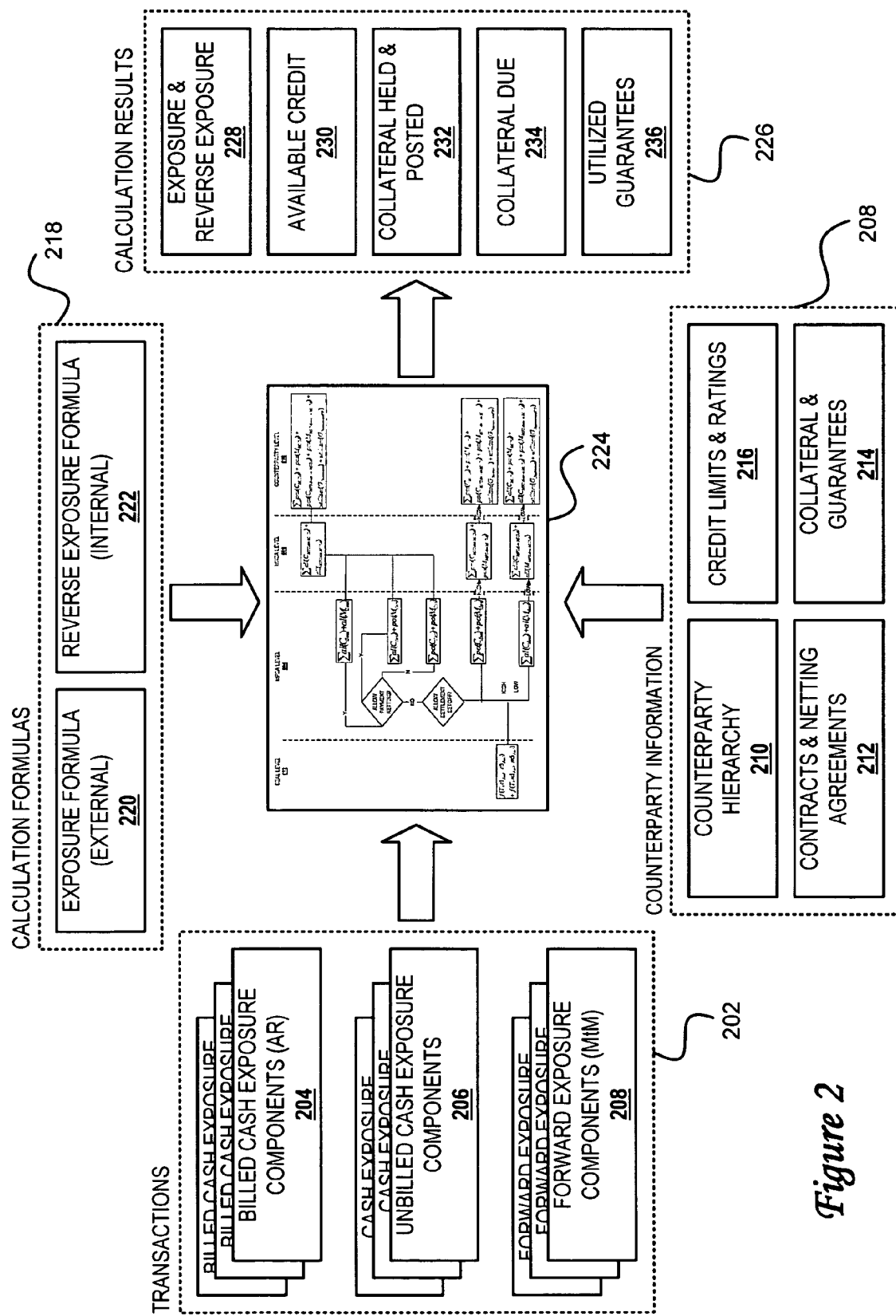
FIG. 2 shows a a block diagram of a conceptual dataflow diagram of the operation of the credit exposure application, in accordance with a preferred embodiment of the present invention.

With reference now to FIG. 2, there is shown a block diagram of a conceptual dataflow diagram of the operation of the credit exposure application, in accordance with a preferred embodiment of the present invention. The sum total of all transactions 202, sometimes called deals, entered into by the trading organization or one of its affiliated legal entities using software system 100 to determine its financial exposure on deals or contracts (hereinafter the "organization") is made accessible to credit limits application, for example from database 114 or line of business applications 112. Transactions 202 are a collection of data components on the financial exposure to the organization represented by each of the contractual transactions 202 entered into by the organization. Billed cash exposure components 204 represent the accounts receivable (AR) resulting from the billed amounts due from each of the counterparties to the organization in the transactions 202. Unbilled cash exposure components 206 represents each component of the transactions 202 that currently exist as a result of the contractual commitments of transactions 202. Forward exposure components 208 represents mark-to-market (MtM) data on future exposure represented by transactions 202.

Counterparties, contracts and credit information are collected by the credit exposure module 105 to build and store counterparty information block 208. This counterparty information 208 represents a database of information regarding the counterparties and contractual relationships created by transactions 202. Counterparty hierarchy 210 provides a plurality of structural models defining interconnected corporate identities and contractual relationships for each counterparty. Contracts and netting agreements 212 provides a database of contractual agreements with each counterparty and their related rights and obligations comprising the transactions 202.

As will be appreciated, contracts and netting agreements 212 specify the critical rights and relationships between the parties and can be quite complex. This complexity is significantly pronounced in the energy industry to which the present embodiment has particular application. Most energy traders buy and sell commodities both in a physical sense, where actual delivery of a product will eventually take place, and in a financial sense, where only money will change hands based on future market value. They often trade these commodities with each other—exchanging different quantities of the same commodity several times during a given month, week or day. Because of this web of trading contracts, the financial exposure between two companies might be millions of dollars on any given day.

Trading companies use two simple techniques to reduce their credit risks: collateral and netting (also called set-off). Based on the financial strength of their trading partners, companies have required the posting of collateral prior to any trading. Generally, a security interest is granted in the collateral so that it can be applied to any unpaid obligations. Trading companies also have included the concept of netting in their trading agreements. Netting allows the parties to set-off any amounts they owe each other and only pay the "net" owed from one party to the other.

Master Netting, Setoff, Security and Collateral Agreements create a global view of the energy trading business, recognizing that most of the players are trading multiple commodities between multiple affiliates and subsidiaries. The master netting agreement links all underlying commodity-trading agreements between two companies into a single, integrated agreement. This integration is important because it prevents a bankrupt trading party from choosing and excluding commodity transactions based on whether or not the transactions are favorable to the bankrupt party. In addition, the agreement allows the parties to adopt a uniform definition of events that will constitute default under all trading agreements between the parties. The agreement also allows the parties to adopt a uniform method by which transactions under all trading agreements will be terminated and liquidated in the event of a default. These provisions bring consistency to this liquidation process, which might otherwise be chaotic as the non-defaulting party tries to apply different calculation provisions for different commodities. This consistency also is important because it prevents uncertainties in the liquidation process from delaying the final closeout of obligations between the parties. Further, the agreement encourages the parties to net monthly payments that they owe each other under all of the underlying trading agreements. Such "cross-product" and "cross-affiliate" netting reduces the cash demands on both parties and greatly reduces their overall credit exposure. Finally, the agreement establishes a single collateral-posting requirement between the parties to cover the total exposure under all of the underlying trading agreements. This provision reduces the total amount of collateral that each party is required to provide and in turn makes more of their "credit" available for trading activities with other companies.

Collateral and guarantees 214 represents contractual arrangements that provide collateral and guarantees against transactions 202 and contracts and netting agreements 212, whether provided by a counterparty or third party guarantor. Credit limits and ratings 216 represents credit rating information collected from various third party sources on each of the counterparties and includes credit limits set by the organization that triggers certain events if exceeded by a counterparty.

Also represented in FIG. 2 are the calculation formulas 218, which include an external exposure formula 220 and a reverse exposure formula 222. Exposure formula 220 represents a mathematical equation selected to model the financial exposure of the organization as a function of the deals 202 and counterparty information 208. Reverse exposure formula 222 represents an equation selected to model the reverse exposure the organization subjects on its counterparties.

A calculation engine 224 receives as inputs the transactions 202, counterparty information 208 and calculation formulas 218. In particular, calculation engine 224 computes exposure formula 220 and reverse exposure formula 222 using, as inputs, the billed cash exposure components 204, unbilled cash exposure components 206, forward exposure components 208, counterparty hierarchy 210, contracts and netting agreements 212, collateral and guarantees 214 and credit limits and ratings 216. The outputs of calculation engine 224 are the calculation results 226. Calculation results 226 present an exposure and reverse exposure calculation 228, an available credit calculation 230, a collateral and posted calculation 232, a collateral due calculation 234 and a utilized guarantees determination 236.

Figure 3:
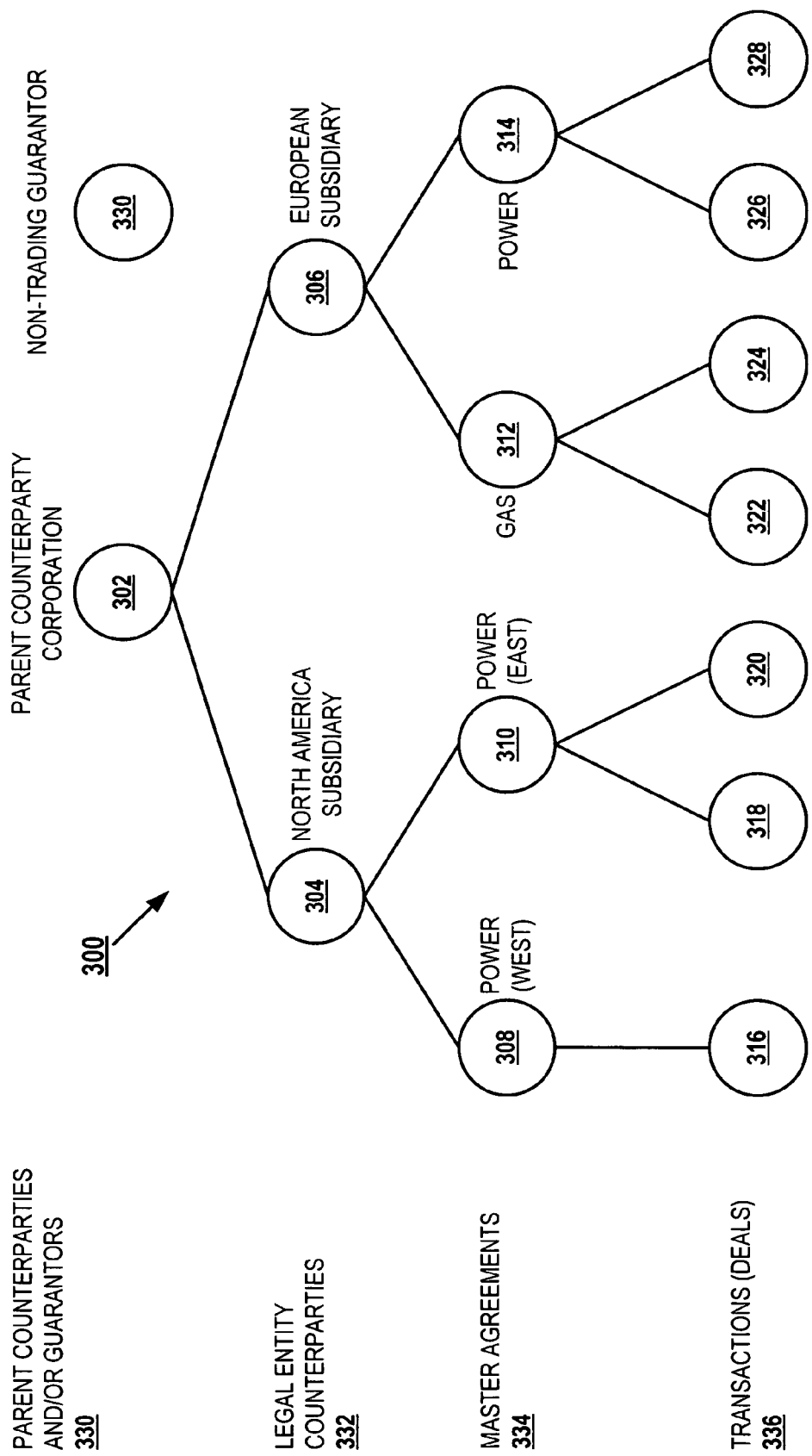
FIG. 3 shows a hierarchical chart 300 representing the organizational structure and legal relationships of a parent counterparty and its affiliated legal entities, as utilized in a preferred embodiment of the present invention.

With reference now to FIG. 3, there is shown a hierarchical chart 300 representing the organizational structure and legal relationships of a parent counterparty and its affiliated legal entities, as utilized in a preferred embodiment of the present invention. As seen in this example of a counterparty structure 300, there is shown a parent counterparty corporation 302 at a parent counterparties level 330. Two legal entity counterparties represented by the North American subsidiary 304 and European subsidiary 306 are at the legal entity counterparties level 332. As will be appreciated, while only a single level of counterparties 332 are shown in the example of FIG. 3, any number of levels of counterparties could be formed by the hierarchical structure, either below or above the counterparty's level.

Parent counterparty corporation 302 and/or North America subsidiary 304 and European subsidiary 306 has entered into four master agreements 308-314 at master agreements level 334 with the organization or one of its legal entities. The power west master agreement 308 and power east master agreement 310 have been entered into with the North American subsidiary 304, while the gas master agreement 312 and power master agreement 314 have been entered into with the European subsidiary 306 of the parent corporation 302. As will be appreciated, while only a single level of master agreements 334 are shown in the example of FIG. 3, any number of levels of master agreements could be formed by the hierarchical structure, either below or above the master agreement level 334.

Last, the hierarchical tree structure 300 has a transaction level 336 that indicates the specific transactions 316-328, which have been entered into with each of the legal entity counterparties 304, 306 under the master agreements 308-314. Thus, the organizational structure 300 presents the diagram of the legal relationships between the transactions in which the organization has entered into with the parent counterparty corporation and/or each of its legal entity subsidiaries. As will be appreciated, transactions 316-328 can also be directly connected to parent counterparty 302 without being covered in a master agreement. Also shown in FIG. 3 is a non-trading guarantor 330 legally committed to guarantee one or more of the transactions 316-328 or master agreements 308-314 up to a predefined guaranteed limit.

Figure 4:
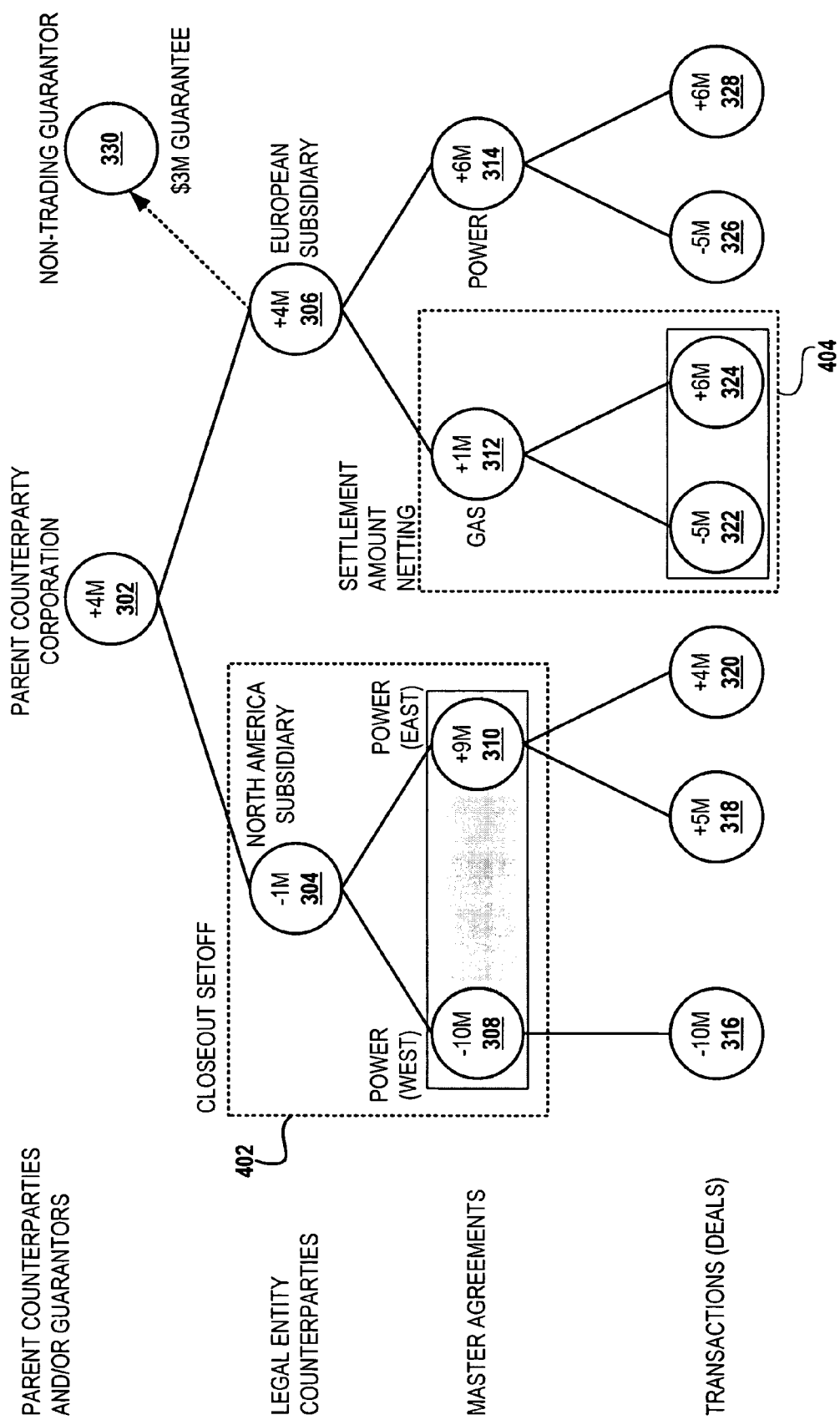
FIG. 4 shows an example scenario of a credit exposure calculation, in accordance with the preferred embodiment of the present invention.

With reference now to FIG. 4, there is shown an example scenario of a credit exposure calculation, in accordance with the preferred embodiment of the present invention. Within each circle representing an entity or agreement, a dollar amount of financial obligations the transaction represents is shown in millions. A positive number indicates the exposure to the organization represented by the cumulative financial exposure deriving from all of the obligations and netting/offsetting rights linked from lower levels in the hierarchy and at that node in the hierarchical tree 300. A negative number represents the reverse exposure or value of the transactions held by the organization and negatively impacts the counterparty in the event of default.

In this example, the organization and parent counterparty or legal entity counterparties have entered into a master netting and closeout setoff agreements 404, 402 to allow the parties to net collateral obligations and set off rights across transactions to achieve a single amount owed between the parties to the master agreements. When master netting agreements are utilized across affiliates, they permit affiliates to net their obligations to post collateral and thereby decrease the net amount each family of companies post to the other. Master netting agreements can provide similarly valuable rights in the context of closeout setoff. When a family of companies suffers an event of default, companies can net closeout amounts owed to the defaulting parties and their affiliates against closeout amounts owed by the non-defaulting parties and their affiliates. Moreover, master netting agreements enable entities to provide that all contracts share the same events of default, early termination and liquidation rights, and set off provisions.

In the example shown in FIG. 4, a closeout setoff 402 has been applied to the master agreements 308, 310 entered into by North American subsidiary 304. Also seen in FIG. 4 is settlement amount netting arrangement 404 between the counterparties and the organization.

Credit exposure module 105 calculates the impact to the organization of a default on one or more of the transactions 316-328. For this example, it is assumed that the legal entity counterparties 304 and 306 default on a total of $12 M in obligations in transactions 324 and 328. As can been seen, the net exposure to North American subsidiary 304 was a reverse exposure of −$1 M due to the closeout setoff 402 of the master agreements 308 and 310 (at a minus $10 M and plus $9M, respectively). The settlement amount netting arrangement 404 results in a net exposure of +$1 M from the gas master agreement 312. Also shown is a $3 M guarantee agreement between the European subsidiary 306 and the non-trading guarantor 330. Thus, where the European subsidiary 306 defaults on $12 M of obligations transactions 324 and 328, the credit limits module 107 shows exposure of +$4 M as a net exposure to the counterparty 306. This results because of the settlement amount netting 404 producing a net exposure of $1 M from the gas master agreement 312 and the full exposure of $6 M from power master agreement 314 because of a lack of a settlement amount netting agreement for that master agreement. The cumulative $7 M in exposure from master agreements 312, 314 is offset by the offsetting protection of $3 M from the non-trading guarantor 330, leaving an exposure calculation of $4 M at the European subsidiary 306. Because the closeout setoff agreement insulates the reverse exposure from the North American subsidiary, the entire exposure at parent counterparty corporation 302 is $4 M.

Figure 5:
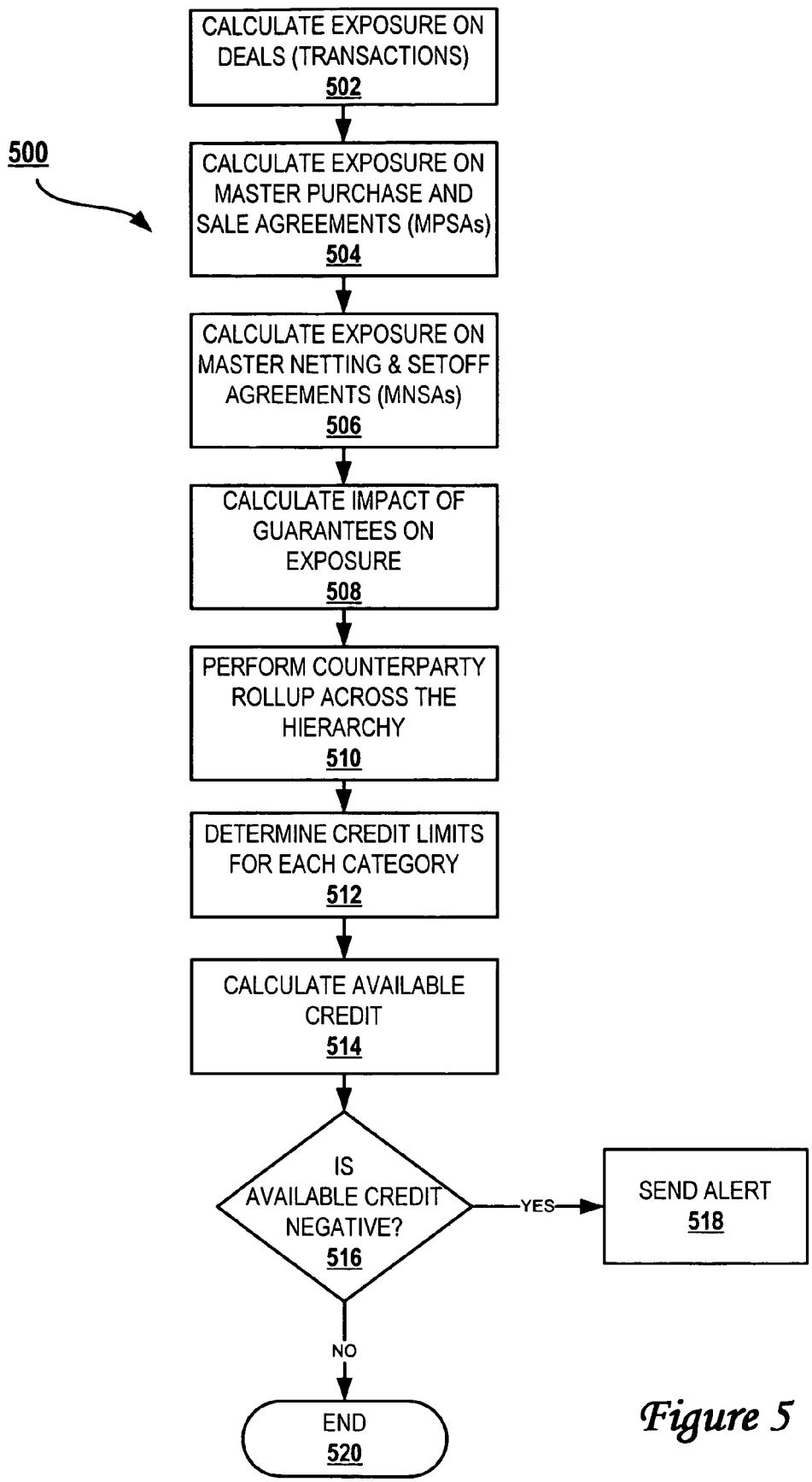
FIG. 5 shows a flow diagram of a process implemented by the credit exposure and credit limits modules, in accordance with a preferred embodiment of the present invention.

With reference now to FIG. 5, there is shown a flow diagram of a process implemented by the credit exposure and credit limits modules, in accordance with a preferred embodiment of the present invention. Process 500 begins at step 502, where calculation engine 224 calculates the financial exposure the organization has to the specified transactions 202. Exposure and reverse exposure calculations 228 are computed by applying the exposure formula 220 and reverse exposure formulas 222 to the exposure components 204, 206 and 208 and deal attributes 208 in order to calculate a deal level (transactions 316-328) result of financial exposure to the deal.

At step 504, the exposure on Master Purchase and Sale Agreements (MPSAs) is calculated across all legal entity counterparties within the hierarchy of the parent counterparty hierarchy. The calculation at step 504 applies the netting and setoff rules within the MPSA level with respect to all deals that apply to a particular MPSA. This "rolls up" the exposure calculation from all deals to the MPSA level. This can be seen in FIG. 6 for the payment netting method at MPSA level 604. The calculation at step 504 further includes applying the collateral terms of the MPSA to the exposure calculation to determine the collateral due from the counterparty.

At step 506, the exposure numbers are modified based on the master netting and setoff agreements (MNSAs) with the counterparty. At this step, the netting and setoff rules resulting from the MNSA are applied when summing up exposures from the plurality of MPSA's with the counterparty. In addition, collateral terms are applied to the exposure calculation to determine collateral due of the MNSA governs collateral. The impact of guarantees on the exposure levels calculated based on MPSA and MNSA level results is calculated at step 508. At step 510, a counterparty "rollup" is created across the entire hierarchy of the counterparty by summing all calculated exposures at all levels of the counterparty hierarchy.

At step 512, credit limits for each credit limit category is determined by user input or accessing a database of credit limits. At step 514, the available credit for the applicable counterparty in each category is calculated by subtracting the credit limit for a given category from the exposure calculated for that credit limit category. For example, exposure and credit limit calculations can be categorized into an overall calculation for the counterparty or into physical or financial transaction categories. At step 516, a determination is made whether available credit for a given counterparty or category is negative. If so, the process proceeds to step 51, where an alert or notification is sent through web-based user interfaces 103, for example. Thereafter, the process ends at step 520.

Figure 6:
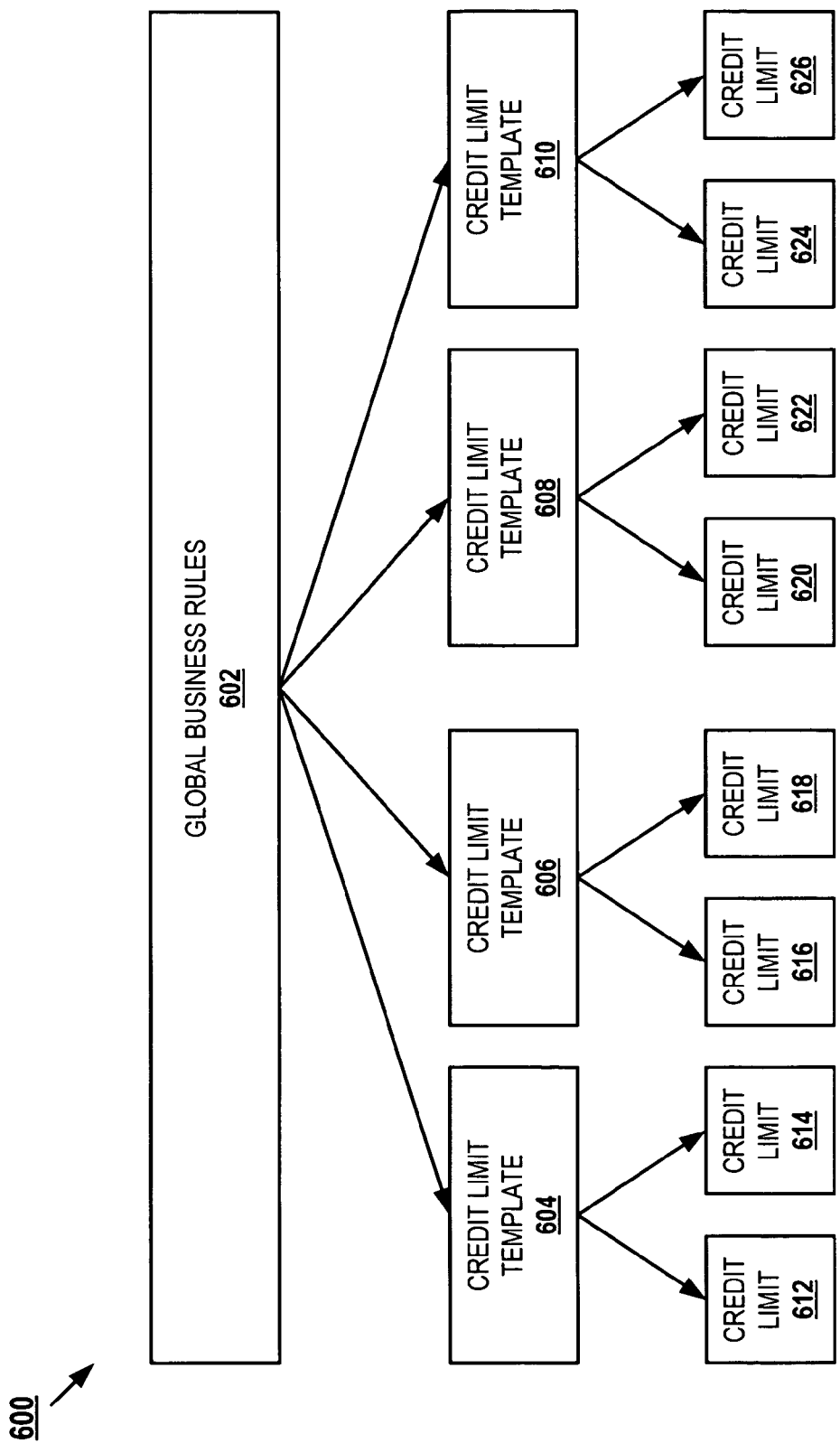
FIG. 6 shows a block diagram showing the three main levels of definitions for defining the credit limits of the system, in accordance with the preferred embodiment of the present invention.

With reference now to FIG. 6, there is shown a block diagram showing the three main levels of definitions for defining the credit limits of the system, in accordance with the preferred embodiment of the present invention. The hierarchical diagram 600 defines the three main levels of the credit limits module 107. Credit limits module 107 is a dynamic system for defining, maintaining, and recalling credit limits for a wide variety of trading partners or counterparties.

Global business rules 602 are a set of parameters that define how the credit limits module 107 should function at a high level, and set constraints for all of the credit limit templates and credit limit functions to be utilized by the credit limits module 107. Global business rules 602 define a coarse set of high-level business rules to be used in the database accessed by credit limits module 107. These business rules govern the inter-workings of the rest of the system and define the basic "ground rules" for how credit limits are handled. Global business rules 602 govern the accounting rules, credit limit categories, security instruments, threshold levels and alert types, in the credit check schedule used by credit limits module 107. The credit limit categories to be utilized include commodity types, commodity grades, transaction types (physical/financial), netting rules (netted, non-netted), deal durations and custom-defined fields.

Credit limit templates 604-610 are a more specific set of business rules that define how a given type of credit limit will function within the credit limits module 107. These templates 604-610 allow many counterparties to share the same "type" of credit limits, but to each have different values for that credit limit. Credit limit template 604-610 provides the basic framework for later credit limits to be defined at a specific counterparty level. The credit limit template 604-610 include a template name and ID, template scope, which defines the counterparties using this template, a template structure as defined by the credit limit categories, start and end dates and time bands.

Credit limits 612-626 are the specific values for the credit limits set for a given type of counterparty. Credit limits 612-626 are defined by the system user to specify the actual credit limit values (numbers) for a given counterparty in the system.

Figure 7:
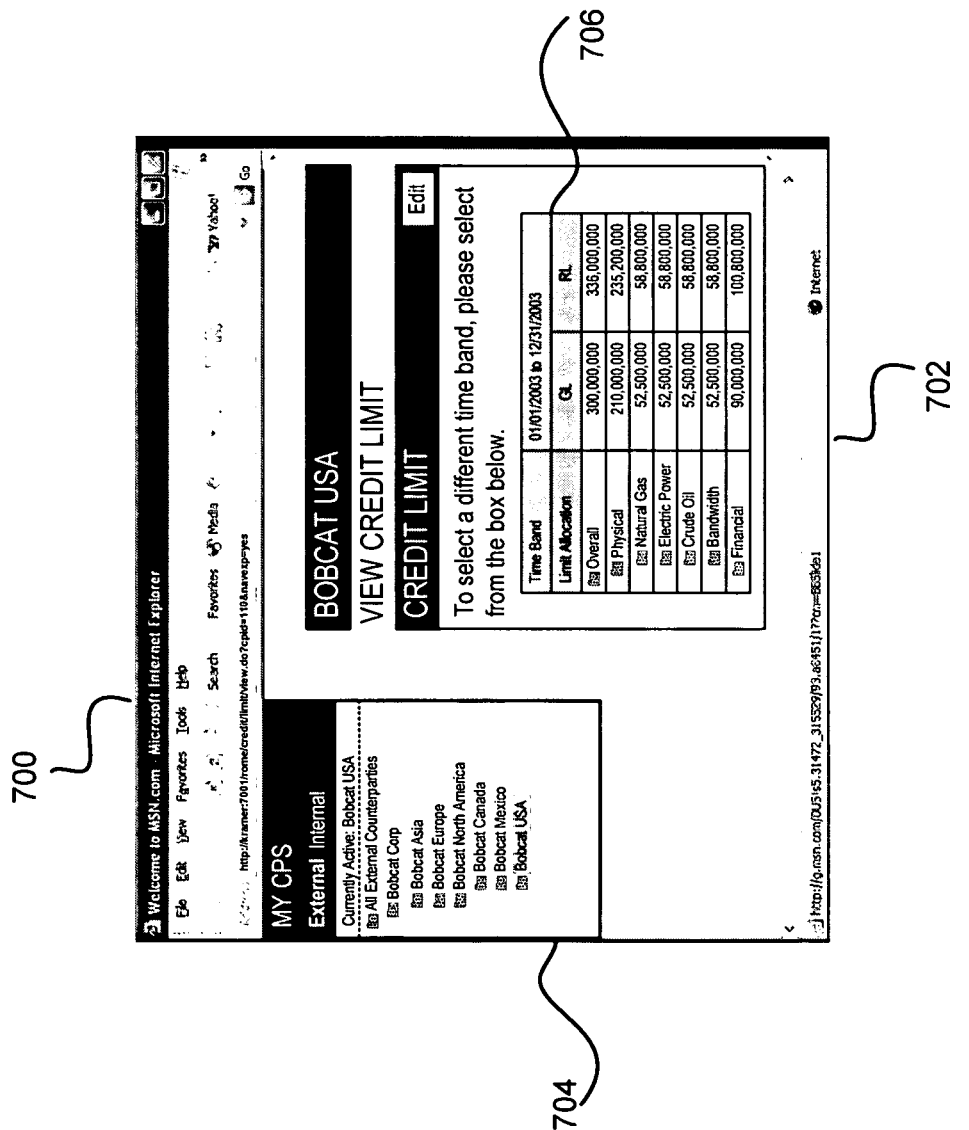
FIG. 7 shows a wireframe or screenshot of a web browser window presented as part of web-based user interfaces for displaying credit limits set for a counterparty, in accordance with the preferred embodiment of the present invention.

FIG. 7 shows a wireframe or screenshot of a web browser window presented as part of web-based user interfaces 103 for displaying credit limits set for a counterparty. Browser window 700 includes a display frame 702 presenting the credit limit specifications for the counterparty or counterparty group selected by the system user using software system 100 navigation tools shown within display field 704. As seen in FIG. 7, the counterparty selected in window display 704 becomes the "active" counterparty, for example, "Bobcat USA" or a counterparty group, for example "Bobcat Corp," for which the credit limit data in display field 702 applies. Counterparties are identified in a hierarchical menu of parent-child relationships, where child counterparties are shown indented from the left margin below its parent counterparty.

As seen in this credit limit view in display field 702, a time band 706 is set to identify the period over which the credit limits are effective. A limit allocation 708 indicates the identified category to which a credit limit has been set. Each of a Green Light (GL) credit limit and a Red Light (RL) credit limit is specified for the "overall" counterparty, and each of the "physical" and "financial" categories for the selected counterparty. A GL credit limit is a low credit limit and a RL is a high credit limit for the counterparty. Further, as shown in the example of FIG. 7, the "physical" category is further broken down into credit limits that apply to each of the physical categories—in this example, Natural Gas, Electric Power, Crude Oil and Bandwidth.

Figure 8:
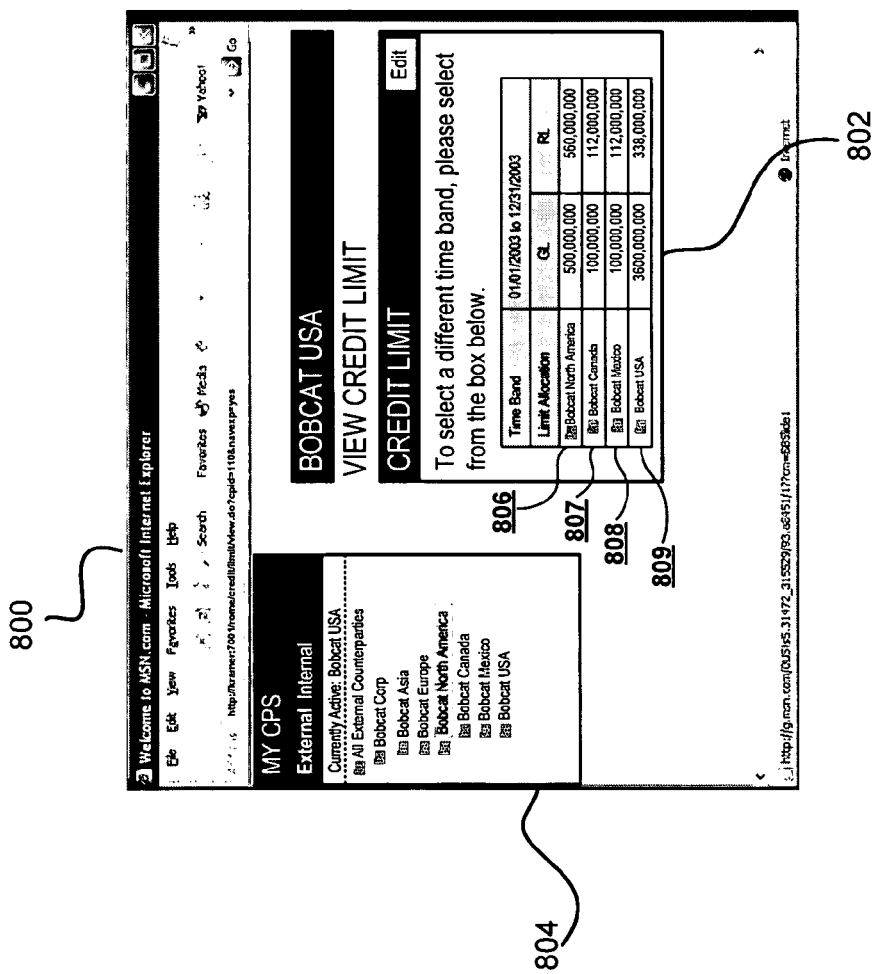
FIG. 8 shows a wireframe or screenshot of a web browser window presented as part of web-based user interfaces 103 for displaying credit limits set for multiple counterparties, in accordance with the preferred embodiment of the present invention.

FIG. 8 shows a wireframe or screenshot of a web browser window presented as part of web-based user interfaces 103 for displaying credit limits set for multiple counterparties. Browser window 800 includes a display frame 802 presenting the credit limit specifications for each of the counterparties and the parent counterparty group selected by the system user using software system 100 navigation tools shown within display field 804. As seen in FIG. 8, the counterparty selected in window display 804 is "Bobcat North America" and becomes the "active" counterparty for which the credit limit data in display field 802 applies. Row 806 identifies the parent counterparty ("Bobcat North America") and its associated GL and RL. Rows 807-809 identify each of its child entity counterparties ("Bobcat Canada," "Bobcat Mexico," and "Bobcat USA") with each of their corresponding GL and RL credit limits.

Figure 9:
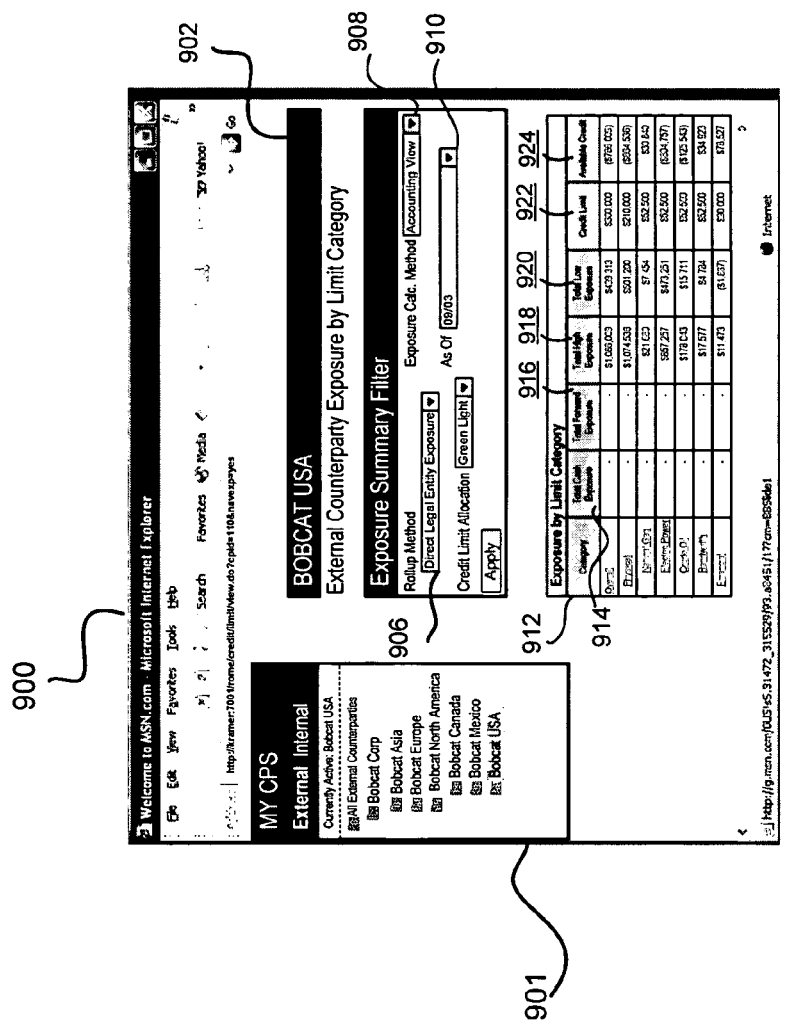
FIG. 9 shows a wireframe display or screenshot of a web browser displaying the external counterparty exposure by limit category view, in accordance with a preferred embodiment of the present invention.

With reference now to FIG. 9, there is shown a wireframe display or screenshot of a web browser displaying the external counterparty exposure by limit category view, in accordance with a preferred embodiment of the present invention. Window 900 includes a display field 901 showing a hierarchical view of counterparties and their parent-child relationships. As shown in FIG. 9, "Bobcat USA" has been selected by the system user using software system 100 navigation tools shown within display field 901 as the active counterparty for the view. Display field 902 shows the selectable menu options for the "Exposure Summary Filter" for the credit limit data shown display field 904. Display field 904 displays the exposure by limit category for the active counterparty. Menu field 906 specifies the rollup method selected using the pull-down menu to calculate the credit limit numbers shown in display field 904. In this case, a "direct legal entity exposure" method has been used. A rollup method specifies how the exposure numbers are extracted from the hierarchical exposure calculations for display in display field 904. Field 908 specifies the credit limit allocation to be viewed in the display field 904. As shown in FIG. 9, the Green Light (GL) credit limit allocation is used to set credit limits at column 922. Field 908 specifies the exposure calculation method used to generate the exposure calculations 914-920. As seen in FIG. 9, field 908 specifies the accounting view (payment netting method) is used of the exposure calculation. Field 910 specifies the "as of" date for which the exposure and credit limit calculations are performed.

As shown in FIG. 9, display field 904 contains a table specifying the category 912, total cash exposure 914, total forward exposure 916, total high exposure 918, total low exposure 920, credit limit 922 and available credit 924 for the active counterparty as selected in display field 901. Category 912 specifies the categories set up by the system user to categorize exposure and credit limit calculations. The table specifies the categories, corresponding exposure, and limit numbers in a hierarchical fashion. For example, the "Overall" category is a rollup of all the categories at the next lower level (i.e., physical and financial). Similarly, the "Physical" row is a rollup of all the categories at the next lower level at the hierarchical tree (i.e., Natural Gas, Electric Power, Crude Oil and Bandwidth). Credit limit 922 specifies the credit limit set by the user for each of the categories 912.

The available credit 924 specifies the available credit that the counterparty has within the applicable category based in the difference between a selected exposure 914-918 and the credit limit 922. Available credit 924 in display filed 904 for this example was calculated by subtracting the credit limit 922 from the total high exposure 918. For example, the available credit for the "overall category" shows a negative number, indicating that the organization is already overexposed to the counterparty and does not have any available credit to extend to that counterparty for additional transactions. Additionally, an alert or notification can be sent through web-based user interfaces 103, for example, when the available credit 924 for a given counterparty and category becomes negative, making it easy for system users to identify trouble spots by counterparty, geography, industry, and credit rating and to manage the company's liquidity.

Figure 10:
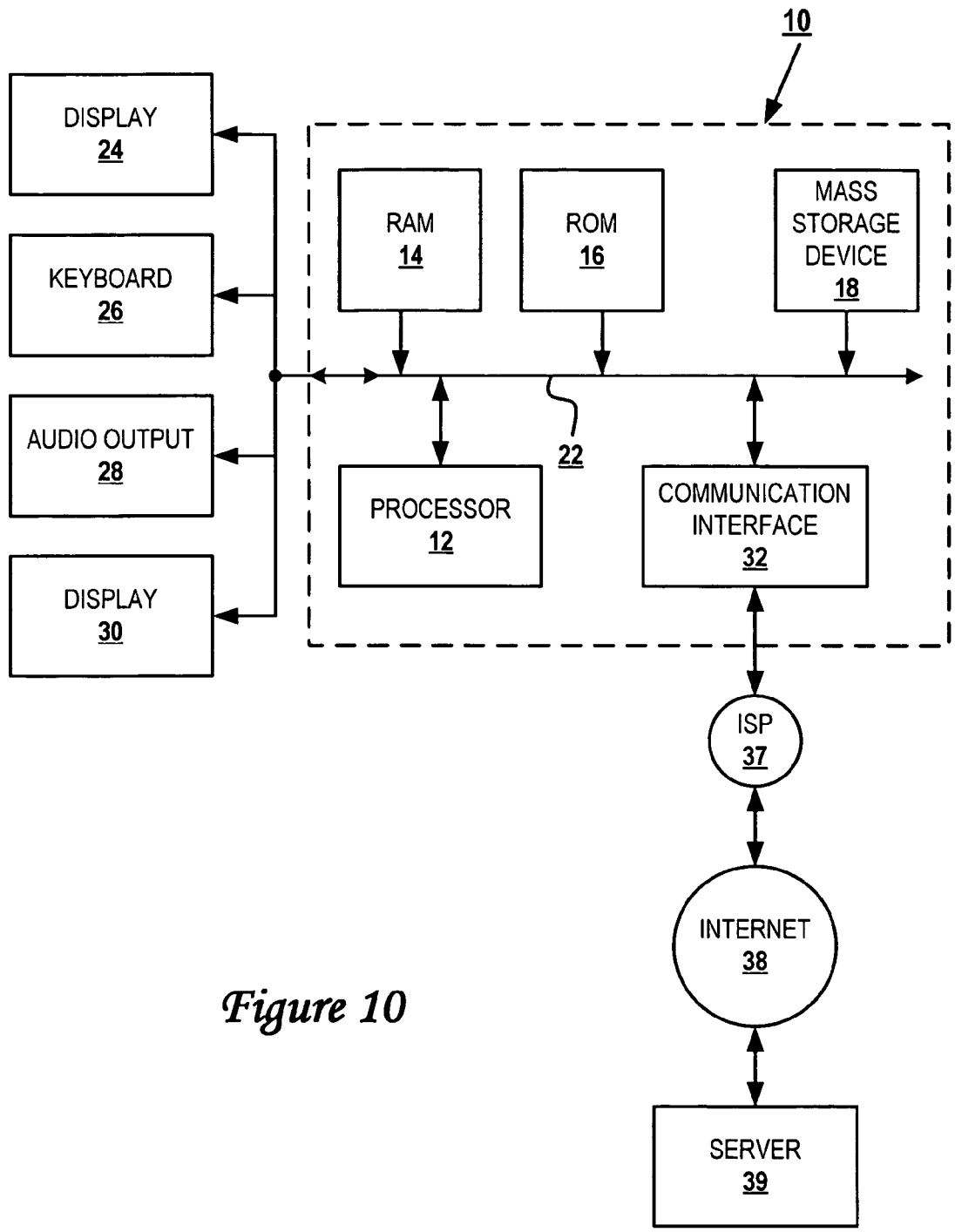
FIG. 10 depicts a data processing system network in which a preferred embodiment of the present invention may be implemented.

FIG. 10 shows a high-level block diagram of a data processing system 10, which may be a high-level computer system, consistent with an embodiment of the invention with which the method, system and program of the present invention may advantageously be utilized. The present invention may be executed in a variety of systems, including a variety of computing systems and electronic devices under a number of different operating systems. In one embodiment of the present invention, the system is a portable computing system such as a notebook computer, a desktop computer, a network computer, a midrange computer, a server system or a mainframe computer. Therefore, in general, the present invention is preferably executed in a computer system that performs computing tasks such as manipulating data in storage that is accessible to the computer system. In addition, the computer system preferably includes at least one output device and at least one input device.

A computer system, for example computer system 10, can be considered as three major components: (1) the application programs, such as a spreadsheet or word processing or graphics presentation application, which are used by the user; (2) the operating system that transparently manages the application's interactions with other applications and the computer hardware; and (3) the computer hardware comprising the processor, the random access memories, the actual electronic components which manage the digital bits. The operating system has a kernel which, inter alia, controls the execution of applications, processes, and/or objects by allowing their creation, termination or suspension, and communication; schedules processes/objects of the same or different applications on the hardware, allocates memory for those objects, administers free space, controls access and retrieves programs and data for the user.

As seen in FIG. 10, data processing system or computer system 10 comprises a bus 22 or other communication device for communicating information within computer system 10, and at least one processing device such as processor 12, coupled to bus 22 for processing information. While a single CPU is shown in FIG. 10, it should be understood that computer systems having multiple CPUs could be used. Processor 12 may be a general-purpose processor that, during normal operation, processes data under the control of operating system and application software stored in a dynamic storage device such as random access memory (RAM) 14 and a static storage device such as Read Only Memory (ROM) 16 and mass storage device 18, all for storing data and programs. The system memory components are shown conceptually as single monolithic entities, but it is well known that system memory is often arranged in a hierarchy of caches and other memory devices. The operating system preferably provides a graphical user interface (GUI) to the user. In a preferred embodiment, application software contains machine executable instructions that when executed on processor 12 carry out the operations and processes of the preferred embodiment described herein. Alternatively, the steps of the present invention might be performed by specific hardware components that contain hardwire logic for performing the steps, or by any combination of programmed computer components and custom hardware components.

Communication bus 22 supports transfer of data, commands and other information between different devices within computer system 10; while shown in simplified form as a single bus, it may be structured as multiple buses, and may be arranged in a hierarchical form. Further, multiple peripheral components may be attached to computer system 10 via communication bus 22. A display 24 such as a cathode-ray tube display, a flat panel display, or a touch panel is also attached to bus 22 for providing visual, tactile or other graphical representation formats. A keyboard 26 and cursor control device 30, such as a mouse, trackball, or cursor direction keys, are coupled to bus 22 as interfaces for user inputs to computer system 10. In alternate embodiments of the present invention, additional input and output peripheral components may be added. Communication bus 22 may connect a wide variety of other devices (not shown) to computer system 10 and to other adapters connected to other devices such as, but not limited to, audio and visual equipment, tape drives, optical drives, printers, disk controllers, other bus adapters, PCI adapters, workstations using one or more protocols including, but not limited to, Token Ring, Gigabyte Ethernet, Ethernet, Fibre Channel, SSA, Fiber Channel Arbitrated Loop (FCAL), Ultra3 SCSI, Infiniband, FDDI, ATM, ESCON, wireless relays, USB, Twinax, LAN connections, WAN connections, high performance graphics, etc., as is known in the art.

Communication interface 32 provides a physical interface to a network, such as the Internet 38, or to another network server via a local area network using an Ethernet, Token Ring, or other protocol, the second network server in turn being connected to the Internet or Local Area Network. Internet 38 may refer to the worldwide collection of networks and gateways that use a particular protocol, such as Transmission Control Protocol (TCP) and Internet Protocol (IP), to communicate with one another. The representation of FIG. 2 is intended as an exemplary simplified representation of a high-end computer system, it being understood that in other data processing systems 10, variations in system configuration are possible in addition to those mentioned here.

The present invention may be provided as a computer program product, included on a machine-readable medium having stored thereon the machine executable instructions used to program computer system 10 and/or to a peripheral device for installation on a connected adapter to perform a process according to the present invention. The term "machine-readable medium" as used herein includes any medium, signal-bearing media or computer readable storage media that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patters of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of non-volatile media is storage device 18. Volatile media includes dynamic memory such as RAM 14. Transmission media includes coaxial cables, copper wire or fiber optics, including the wires that comprise bus 22. Transmission media can also take the form of electromagnetic, acoustic or light waves, such as those generated during radio wave or infrared wireless data communications. Thus, the programs defining the functions of the preferred embodiment can be delivered to the data processing system 10 information on any machine-readable medium, which include, but are not limited to: (a) information permanently stored on non-write storage media, e.g., read only memory devices within either computer such as CD-ROM disks readable by CD-ROM; (b) alterable information stored on write-able storage media, e.g., floppy disks within a diskette drive or a hard-disk drive; or (c) information conveyed to a computer by a telephone or a cable media network, including wireless communications. Such signal-bearing media, when carrying instructions that may be read by an adapter or a computer to direct the functions of the present invention, represent alternative embodiments.

While the invention has been particularly shown and described with reference to a preferred embodiment, it will be understood by those skilled in the art that various changes in form and detail may be made therein without departing from the spirit and scope of the invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

What is claimed is:

1. A method comprising:
   creating and storing in a memory a hierarchical model of legally associated counterparties and associated transactions with an organization, wherein the hierarchical model includes one or more levels containing a plurality of nodes, wherein the plurality of nodes comprises the legally associated counterparties, transactions and master agreements between the legally associated counterparties and the organization;
   calculating financial exposure for the organization at each node of the hierarchical model;
   creating credit limit categories, wherein each credit limit category comprises one or more nodes of the plurality of nodes having a common characteristic;
   calculating a credit limit for a credit limit category based on credit limits set for the one or more nodes comprising the credit limit category;
   calculating transactional financial exposure at each leaf node resulting from each of the one or more transactions;
   calculating master-level financial exposure at each node of the one or more master levels of the hierarchical model, wherein master-level financial exposure at a given master-level node is calculated as a function of the financial exposure of nodes at a lower level of the hierarchical model linked to the given master-level node;
   calculating counterparty-level financial exposure at each node of the one or more counterparty levels of the hierarchical model, wherein counterparty-level financial exposure at a given counterparty-level node is calculated as a function of the financial exposure of nodes at a lower level of the hierarchical model linked to the given counterparty-level node; and
   generating an aggregate financial exposure for the organization based on an aggregation of the counterparty-level financial exposure.

2. A method according to claim 1, wherein creating a hierarchical model further comprises creating a hierarchical model having:
   a root node representing a parent counterparty;
   one or more counterparty levels in the hierarchical model structured by parent-child relationships between one or more counterparties legally associated with the parent counterparty, each counterparty of the one or more counterparties being represented at a node of the counterparty levels, wherein one or more of the counterparty levels is linked to the root node;
   one or more master levels in the hierarchical model representing parent-child relationships between one or more agreements, wherein each node in the one or more master levels represents an agreement with one or more of the one or more counterparties that provides one or more mechanisms for financial aggregation of transactions at a lower level in the hierarchical model, and wherein one of the master levels is linked to one of the counterparty levels; and
   a plurality of leaf nodes, each representing a transaction with the one or more of the one or more counterparties, each leaf node of the plurality of leaf nodes being linked to one or more nodes of the one or more master levels or one or more nodes of the one or more counterparty levels.

3. A method according to claim 1, wherein a credit limit category is comprised of a counterparty and each of the legally associated counterparties at a lower level in the hierarchical model linked to the counterparty.

4. A method according to claim 1, wherein a credit limit category is comprised of transactions and master agreements relating to a type of transaction.

5. A method according to claim 4, wherein calculating a credit limit is based on the transactions and master agreements relating to the type of transaction that are each linked to a same counterparty at a higher level in the hierarchical model.

6. A method according to claim 4, wherein the type of transaction comprises trading physical assets.

7. A method according to claim 4, wherein the type of transaction comprises financial assets.

8. A method according to claim 1, further comprising sending an alert when calculated financial exposure exceeds a credit limit.

9. A method according to claim 1, further comprising calculating available credit for a credit limit category based on a calculated credit limit for the credit limit category and calculated financial exposure for the one or more nodes comprising the credit limit category.

10. An article of manufacture comprising machine-readable medium including program logic embedded therein that causes control circuitry in a data processing system to perform the steps of:
    creating a hierarchical model of legally associated counterparties and associated transactions with an organization, wherein the hierarchical model includes one or more levels containing a plurality of nodes, wherein the plurality of nodes comprises the legally associated counterparties, transactions and master agreements between the legally associated counterparties and the organization; and
    calculating financial exposure for the organization at each node of the hierarchical model;
    creating credit limit categories, wherein each credit limit category comprises one or more nodes of the plurality of nodes having a common characteristic;
    calculating a credit limit for a credit limit category based on credit limits set for the one or more nodes comprising the credit limit category;
    calculating transactional financial exposure at each leaf node resulting from each of the one or more transactions;
    calculating master-level financial exposure at each node of the one or more master levels of the hierarchical model, wherein master-level financial exposure at a given master-level node is calculated as a function of the financial exposure of nodes at a lower level of the hierarchical model linked to the given master-level node;
    calculating counterparty-level financial exposure at each node of the one or more counterparty levels of the hierarchical model, wherein counterparty-level financial exposure at a given counterparty-level node is calculated as a function of the financial exposure of nodes at a lower level of the hierarchical model linked to the given counterparty-level node; and
    generating an aggregate financial exposure for the organization based on an aggregation of the counterparty-level financial exposure.

11. An article of manufacture according to claim 10, wherein creating a hierarchical model further comprises creating a hierarchical model having:
    a root node representing a parent counterparty;
    one or more counterparty levels in the hierarchical model structured by parent-child relationships between one or more counterparties legally associated with the parent counterparty, each counterparty of the one or more counterparties being represented at a node of the counterparty levels, wherein one or more of the counterparty levels is linked to the root node;
    one or more master levels in the hierarchical model representing parent-child relationships between one or more agreements, wherein each node in the one or more master levels represents an agreement with one or more of the one or more counterparties that provides one or more mechanisms for financial aggregation of transactions at a lower level in the hierarchical model, and wherein one of the master levels is linked to one of the counterparty levels; and
    a plurality of leaf nodes, each representing a transaction with the one or more of the one or more counterparties, each leaf node of the plurality of leaf nodes being linked to one or more nodes of the one or more master levels or one or more nodes of the one or more counterparty levels.

12. An article of manufacture according to claim 10, wherein a credit limit category is comprised of a counterparty and each of the legally associated counterparties at a lower level in the hierarchical model linked to the counterparty.

13. An article of manufacture according to claim 10, wherein a credit limit category is comprised of transactions and master agreements relating to a type of transaction.

14. An article of manufacture according to claim 13, wherein calculating a credit limit is based on the transactions and master agreements relating to the type of transaction that are each linked to a same counterparty at a higher level in the hierarchical model.

15. An article of manufacture according to claim 13, wherein the type of transaction comprises trading physical assets.

16. An article of manufacture according to claim 13, wherein the type of transaction comprises financial assets.

17. An article of manufacture according to claim 10, further comprising sending an alert when calculated financial exposure exceeds a credit limit.

18. An article of manufacture according to claim 10, further comprising calculating available credit for a credit limit category based on a calculated credit limit for the credit limit category and calculated financial exposure for the one or more nodes comprising the credit limit category.

19. A system comprising:
means for creating a hierarchical model of legally associated counterparties and associated transactions with an organization, wherein the hierarchical model includes one or more levels containing a plurality of nodes, wherein the plurality of nodes comprises the legally associated counterparties, transactions and master agreements between the legally associated counterparties and the organization; and
means for calculating financial exposure for the organization at each node of the hierarchical model;
means for creating credit limit categories, wherein each credit limit category comprises one or more nodes of the plurality of nodes having a common characteristic;
means for calculating a credit limit for a credit limit category based on credit limits set for the one or more nodes comprising the credit limit category;
means for calculating transactional financial exposure at each leaf node resulting from each of the one or more transactions;
means for calculating master-level financial exposure at each node of the one or more master levels of the hierarchical model, wherein master-level financial exposure at a given master-level node is calculated as a function of the financial exposure of nodes at a lower level of the hierarchical model linked to the given master-level node;
means for calculating counterparty-level financial exposure at each node of the one or more counterparty levels of the hierarchical model, wherein counterparty-level financial exposure at a given counterparty-level node is calculated as a function of the financial exposure of nodes at a lower level of the hierarchical model linked to the given counterparty-level node; and
means for generating an aggregate financial exposure for the organization based on an aggregation of the counterparty-level financial exposure.

20. A system according to claim 19, wherein means for creating a hierarchical model further comprises means for creating a hierarchical model having:
a root node representing a parent counterparty;
one or more counterparty levels in the hierarchical model structured by parent-child relationships between one or more counterparties legally associated with the parent counterparty, each counterparty of the one or more counterparties being represented at a node of the counterparty levels, wherein one or more of the counterparty levels is linked to the root node;
one or more master levels in the hierarchical model representing parent-child relationships between one or more agreements, wherein each node in the one or more master levels represents an agreement with one or more of the one or more counterparties that provides one or more mechanisms for financial aggregation of transactions at a lower level in the hierarchical model, and wherein one of the master levels is linked to one of the counterparty levels; and
a plurality of leaf nodes, each representing a transaction with the one or more of the one or more counterparties, each leaf node of the plurality of leaf nodes being linked to one or more nodes of the one or more master levels or one or more nodes of the one or more counterparty levels.

21. A system according to claim 19, wherein a credit limit category is comprised of a counterparty and each of the legally associated counterparties at a lower level in the hierarchical model linked to the counterparty.

22. A system according to claim 19, wherein a credit limit category is comprised of transactions and master agreements relating to a type of transaction.

23. A system according to claim 22, wherein means for calculating a credit limit is based on the transactions and master agreements relating to the type of transaction that are each linked to a same counterparty at a higher level in the hierarchical model.

24. A system according to claim 22, wherein the type of transaction comprises trading physical assets.

25. A system according to claim 22, wherein the type of transaction comprises financial assets.

26. A system according to claim 19, further comprising means for sending an alert when calculated financial exposure exceeds a credit limit.

27. A system according to claim 19, further comprising means for calculating available credit for a credit limit category based on a calculated credit limit for the credit limit category and calculated financial exposure for the one or more nodes comprising the credit limit category.

* * * * *